Aug. 7, 1934. S. H. DURBIN 1,969,598
AUTOMATIC GATE FOR TROLLEY BUCKETS AND THE LIKE
Filed Dec. 12, 1931 5 Sheets-Sheet 1

INVENTOR
S. H. Durbin
BY
Philip P. Siggers
ATTORNEY

Aug. 7, 1934.  S. H. DURBIN  1,969,598
AUTOMATIC GATE FOR TROLLEY BUCKETS AND THE LIKE
Filed Dec. 12, 1931  5 Sheets-Sheet 2

INVENTOR
S.H.Durbin
BY Philip F. Liggers
ATTORNEY

Aug. 7, 1934.   S. H. DURBIN   1,969,598
AUTOMATIC GATE FOR TROLLEY BUCKETS AND THE LIKE
Filed Dec. 12, 1931   5 Sheets-Sheet 5
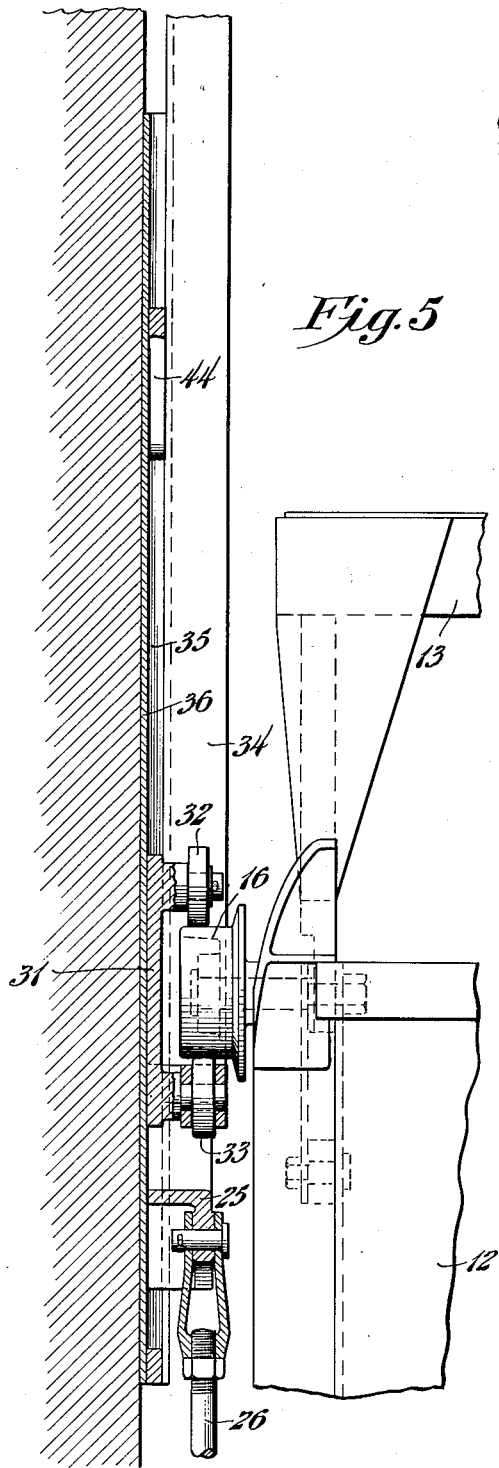
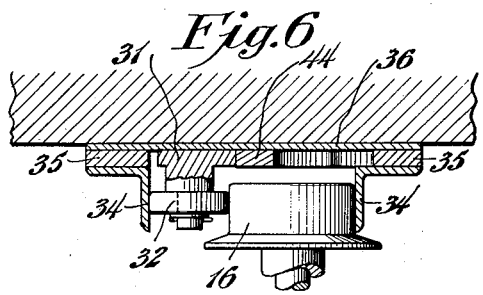
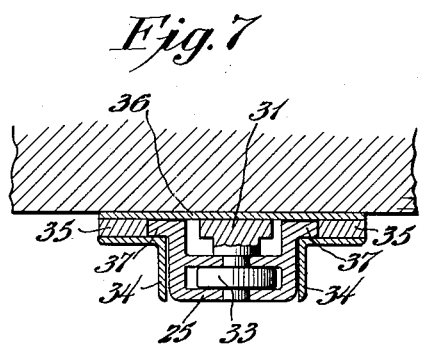
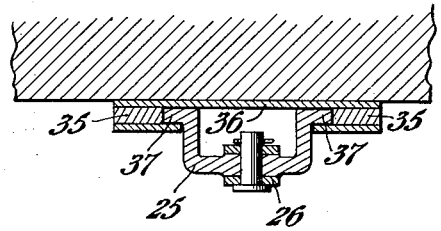
INVENTOR
S. H. Durbin
BY
ATTORNEY Patented Aug. 7, 1934

1,969,598

UNITED STATES PATENT OFFICE 1,969,598

AUTOMATIC GATE FOR TROLLEY BUCKETS AND THE LIKE

Stanley H. Durbin, Hudson, N. Y., assignor to Gifford-Wood Company, Hudson, N. Y., a corporation of New York Application December 12, 1931, Serial No. 580,707

12 Claims. (Cl. 214—125)

This invention relates to gates for bins, hoppers and the like such as are employed in trolley bucket installations and, among other objects, aims to improve the operation of gates, especially of the radial undercut type, by means of the bucket which is loaded from the bin or hopper. The invention provides an improved operating mechanism whereby the gate is opened without contact with the bucket but with force derived from the weight of the descending bucket; gate closing being effected automatically also as the bucket is hoisted, but without contact between any part of the bucket and the gate. In general, the invention provides a gate which has an exceptionally smooth and quiet action, which obviates the use of gate latches, which eliminates spillage (the bucket always being under the gate when spillage might occur), and which makes possible a more compact and hence more economical trolley bucket installation, as fully explained hereinafter.

In the accompanying drawings showing an embodiment of the invention now preferred by me,—

Fig. 5 is an enlarged section on line 5—5 of Fig. 2, part of the bucket being shown also;

Fig. 6 is an enlarged section on line 6—6 of Fig. 3;

Fig. 7 is an enlarged section on line 7—7 of Fig. 2; and

Fig. 8 is an enlarged section on line 8—8 of Fig. 1.

Figure 1:
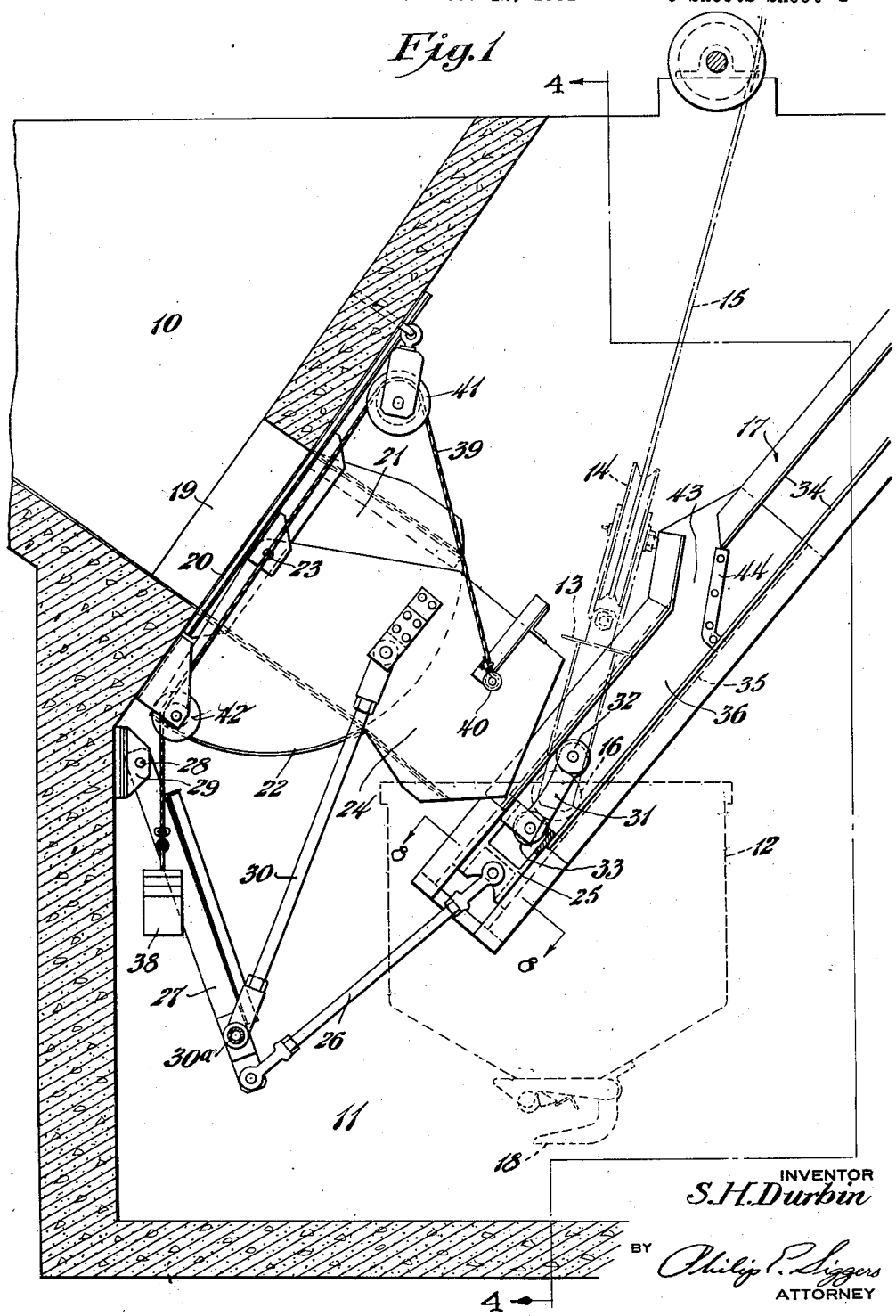
Fig. 1 is a vertical section through a hopper and pit with a gate and gate-operating mechanism in accordance with the invention, the gate being shown open, so as to discharge into a bucket shown in dotted lines.

Referring particularly to the drawings, and first to Fig. 1, there is shown a hopper 10 (which may be of the construction described in the Towne Patent No. 1,720,704 dated July 16, 1929), a pit 11 (or if the ground contour permits, this may be a pocket wholly above ground), and a bucket 12, preferably of the construction described in my Patent No. 1,867,448 dated July 12, 1932. The bucket 12 has a pivoted bail 13, one end of which is shown in Fig. 5, and on top of the bail a sheave 14 is rotatably mounted, a hoist cable 15 being passed under the sheave to hoist and lower the bucket as it is wound in and paid out. The bucket is guided during ascent from and descent to the pit or pocket by means of a pair of rollers 16, one on either side, each roller being received within a track formed by a pair of inclined guides 17 fixed to the side walls of the pit or pocket. Each roller 16 rotates on the pivot axis of the bail 13, for a reason to be explained.

A complete trolley bucket installation, with which the invention is preferably used, is shown in the pending application of H. E. Hallenbeck, Ser. No. 491,534 filed October 27, 1930, assigned to the assignee of this application, and hence it is unnecessary to describe the same other than to explain the complete cycle of the bucket, which is as follows. Assuming that the bucket is loaded, it is first hoisted as high as the trolley (not shown), then the trolley is moved until it is over the discharge point, then the bucket is lowered until its latches 18 contact with the pile of material or with the bottom of the bin, thus opening the bucket and discharging its load by gravity. Immediately the bucket is hoisted to the trolley, the trolley starts up and travels until it is either over or nearly over the pit or pocket; then the bucket is lowered to the loading position (Fig. 1). Hoisting and lowering are effected by the hoist cable 15, while traverse of the trolley in either direction is effected by another independently operated cable, not shown. Preferably the entire cycle is automatically controlled by electrical control mechanism of the character described in the aforesaid Hallenbeck application, so that the bucket will operate continuously, without attention, to transfer materials such as coal, sand, gravel and the like from the hopper 10 to a bin or pile resting on the ground.

The parts so far described are no part of the present invention except as they co-operate with the gate and its operating mechanism to form the new combinations hereinafter claimed.

As shown in Fig. 1, the hopper 10 has a discharge opening 19 which may be more or less closed by a sliding gate (not shown) adjustable by hand and movable in guides 20 on either side of said opening; the purpose of such a gate being to restrict flow of certain materials so that the bucket is not entirely filled when handling them. Extending downwardly from opening 19, within the pit or pocket 11, is a chute 21 fixed to the wall of the hopper. This fixed chute obviously provides an extension of the hopper, and is closed by a pivoted gate 22, pivoted as at 23, and having an arcuate shape so that as it swings on its pivots, it completely closes the lower end of the fixed chute without interference therewith. Secured and extending outwardly from the gate at its top is an extension chute 24 which, when the gate is lowered (Fig. 1), registers with the fixed chute and forms an extension therefor, said extension chute being designed to discharge the material directly into the mouth of the bucket, herein shown as at the top. Preferably, and as shown, the gate and extension chute form an assembly which when lowered allows free flow of material from the hopper in the bucket, until such flow is stopped by the filling, or partial filling, of the bucket and the angle of repose of the material. Said assembly, when raised as in Fig. 3, will prevent all flow of material out of the hopper, as the arcuate gate then completely closes the lower end of fixed chute 21.

Figure 4:
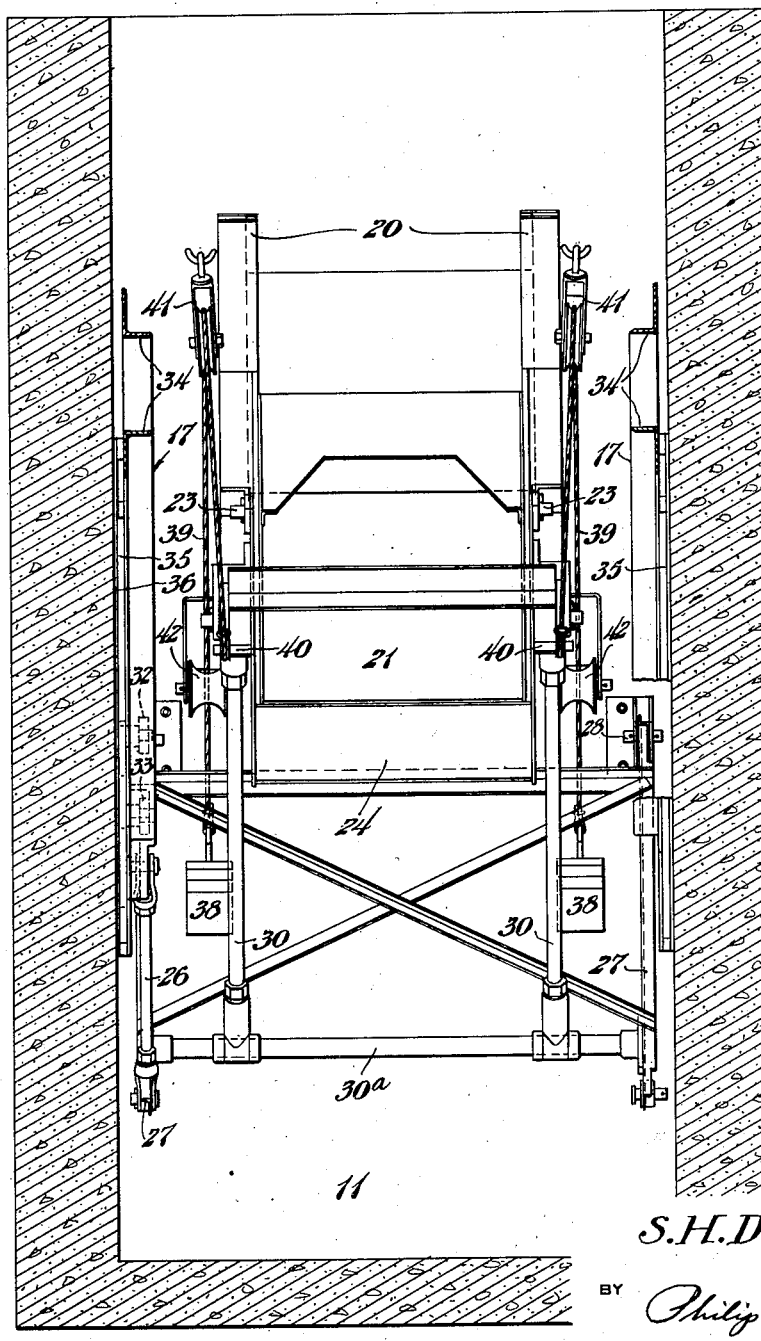
Fig. 4 is a section on line 4—4 of Fig. 1.

According to the present invention, the bucket, as it is lowered into the pit or pocket, engages with a movably mounted mechanism in the pit to cause the gate and chute assembly to swing downwardly, the chute 24 following the bucket as it descends and finally slightly entering its mouth, as shown in Fig. 1. While various members fixed to the bucket might be selected to actuate the gate-operating mechanism, I prefer to employ the rollers 16, whose paths are always exactly the same, since they are confined between the parallel, inclined guides 17. Slidably mounted in each track is a slide-block 25 adapted to be moved down its track by pressure derived from the weight of the bucket acting through the corresponding roller 16, and adapted to be pulled up its track by the bucket during hoisting, as will be particularly described hereinafter. To each slide-block 25 is pivotally connected a link 26, the length of which may be adjusted, and the two links 26 extend downwardly more or less parallel with the tracks and are pivotally connected at their lower ends to the lower end of a pivoted frame 27 on opposite sides. See Fig. 4.

Frame 27 is pivoted as at 28 to members 29 fixed to the side wall of the pit, under the hopper opening, and obviously will swing on its pivot axis as the slide-blocks reciprocate in the guides 17. The swinging frame 27 is connected with the gate and chute assembly by means of adjustable links 30, pivoted at their lower ends by a shaft 30a to the frame near its lower end and pivoted to said assembly on opposite sides about half way between the top and bottom and opposite ends thereof. Thus upward movement of the slide-blocks effects upward swinging of frame 27 and the gate and chute assembly while downward movement effects lowering of said assembly.

While the mechanism for automatic engagement and disengagement of the rollers with the gate-operating mechanism may assume various forms, I prefer that it shall consist of a pair of levers 31, each pivoted at one end to a slide-block, and each having an abutment 32 at its free end against which the corresponding bucket roller pushes when the bucket is being hoisted. Preferably the abutments 32 are rollers so placed as to have rolling engagement with the bucket rollers, as clearly shown in Figs. 1, 2 and 5. Instead of the bucket rollers having direct engagement with the slide-blocks, additional rollers 33 are mounted to rotate about the pivot axis of the levers 31. See Fig. 7. The shortest distance between the peripheries of rollers 32 and 33 is substantially equal to the diameter of the bucket rollers, so that when the bucket rollers engage rollers 33 on the descent of the bucket, they are in contact, or within a small fraction of an inch of being in contact, with the upper rollers 32. Thus anti-frictional engagement of the bucket rollers with the slide-blocks is afforded.

As shown in Figs. 7 and 8, the tracks 17 each consist of a pair of angles 34 spaced apart only slightly more than the width of the slide-blocks 25, and secured to spacers 35 which in turn are secured to plates 36 made fast to the wall of the pit or pocket. The spacers 35 are of such width as to provide a T-slot for the slide-blocks, and the slide-blocks have longitudinal flanges 37 which hook in behind the angles 34 to prevent lateral movement of the slide-blocks while permitting free longitudinal sliding up and down the tracks.

To make smoother the action of the gate assembly and the parts connected thereto, a pair of counterweights 38 are connected to the gate assembly by cables 39 secured as at 40 and passing over swingable sheaves 41 and fixed sheaves 42, all the sheaves being carried by the wall of the pit adjacent the hopper. The effective weight of the counterweights is such that the gate assembly tends to rise to closed position (Fig. 3) and will maintain that position until the bucket forces it open. It will be clear that a single counterweight may be used.

Figure 2:
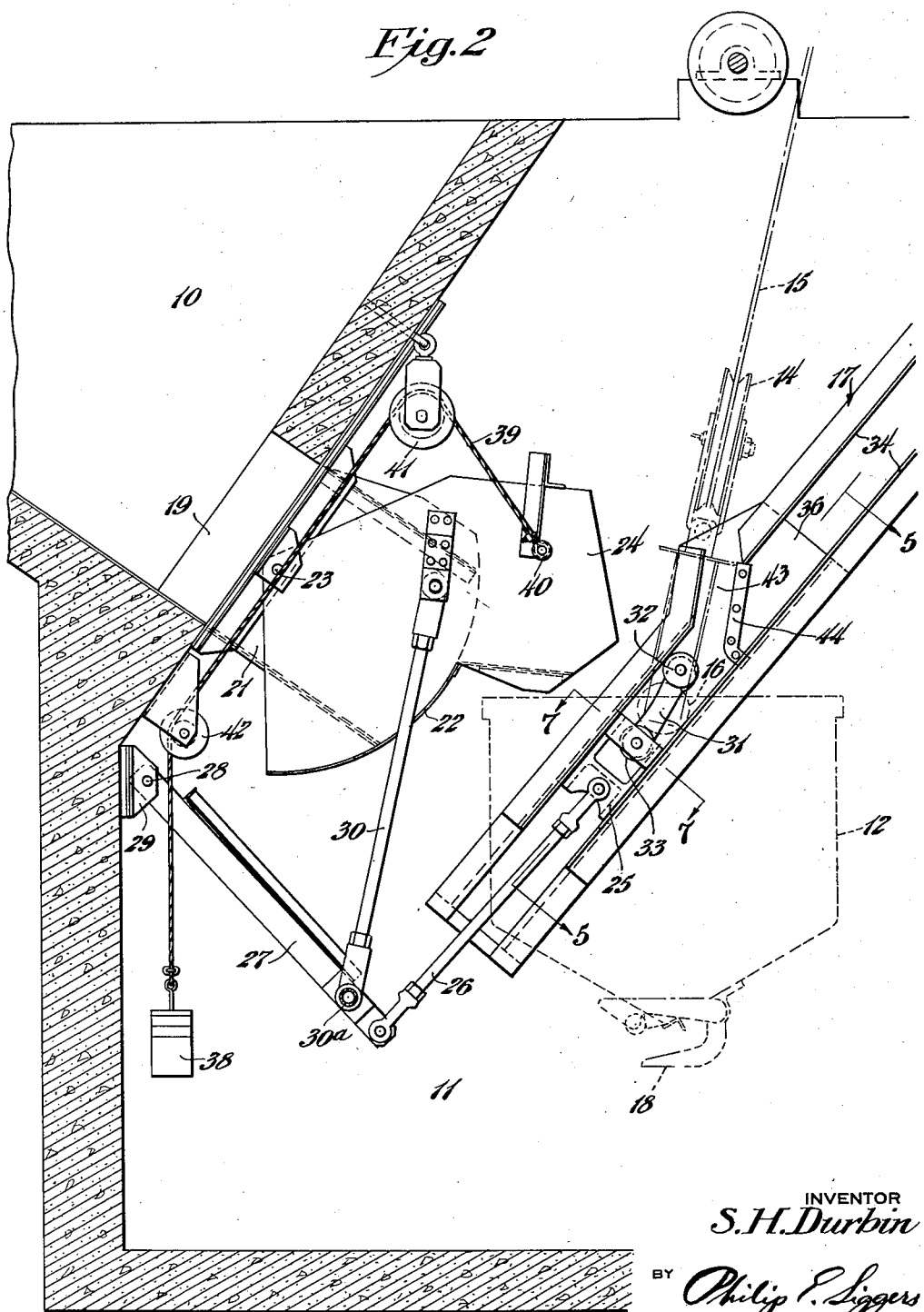
Fig. 2 is a similar view but showing the bucket and gate in partly raised positions (or the view may be considered as showing the bucket being lowered and the gate being opened)

The means by which the levers 31 are moved automatically to engage and disengage the bucket rollers will now be described. As shown in Fig. 2, when the bucket is first hoisted, rollers 32 will roll along the flange of the upper track angle 34, until they come to a gap 43 provided by bending a portion of angle 34 upwardly. When gap 43 is reached, levers 31 will be able to swing counterclockwise as viewed in Fig. 2, and the rollers 32 on the free ends of said levers will enter said gap, this action being effected by the hoisting effort acting through the bucket rollers. See Fig. 3. As soon as the parts are in the position of Fig. 3, the bucket rollers are clear of rollers 32 and hence are disengaged from the slide-blocks, and may pass on up the tracks. The levers 31 then are in contact with fixed guides 44, whose position is such as to provide abutments for said levers only (Figs. 3 and 6), the bucket rollers passing by without any possibility of interference. The levers 31 are prevented from moving into the dead-center position by a stop on each slide-block, as clearly shown in Fig. 1.

Figure 3:
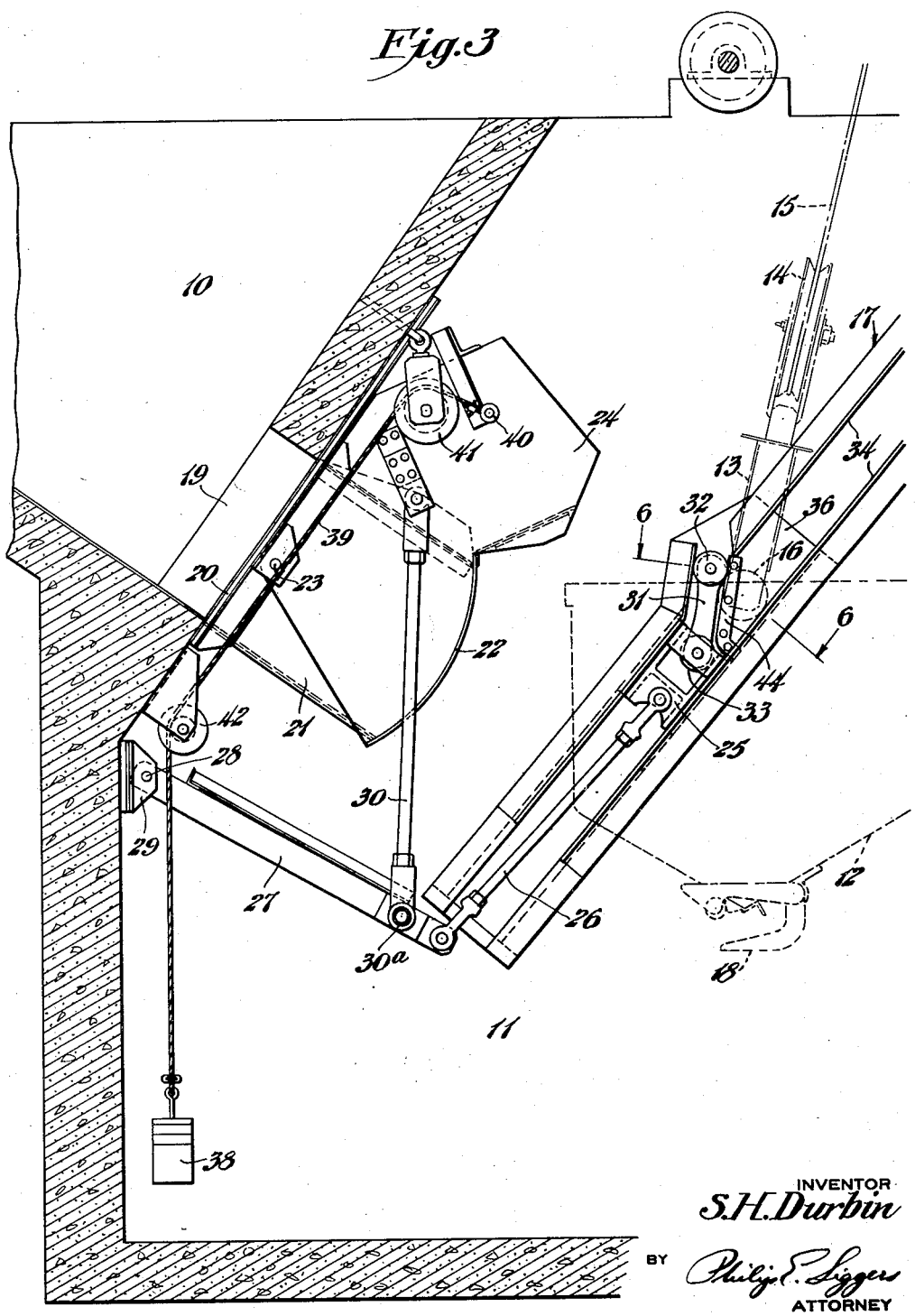
Fig. 3 is a similar view but showing the bucket hoisted still higher (or lowered still less) and the gate in its highest or closed position, the bucket just engaging the gate-operating mechanism so that any further lowering of the bucket will start opening of the gate.

In practice, due to the action of the counterweights and the momentum of the assembly to which they are connected, the rollers 32 move somewhat further than the position of Fig. 3, thus giving ample clearance for the bucket rollers when the bucket returns for another load. If ample clearance were not provided, the bucket rollers during descent would strike rollers 32 and perhaps would swing the levers 31 clockwise, and could not enter the spaces between rollers 32 and 33 and hence would not be temporarily locked to the slide-blocks. Then upon hoisting the bucket, the gate might not close, especially if unusually heavy material filled the extension chute 24, and the pit would be choked with material from the hopper. This could not be remedied desirably by making the counterweights very heavy, so as to insure closing of the gate, because this would work injury to the gate assembly by constant jarring when released by the bucket. Also, the bucket might not descend all the way and hence would not be loaded properly. The described construction has been found to work dependably and to have a very smooth, quiet action.

Referring to Fig. 2, it will be observed that the bucket is under the mouth of the extension chute even when the gate is more than half-way closed. The bottom of the extension chute in the position of Fig. 2 is nearly horizontal, as the dotted lines indicate, and no material will then move along said bottom; but some material in the upper part of the extension chute may be carried by momentum out of the mouth of said chute even when in the illustrated position; hence the desirability of having the bucket under the chute until the chute is so elevated, as in Fig. 3, that no material in it can possibly flow out.

When the bucket is in loading position, it is supported by the hoist cable 15, which is secured to an electric motor operated hoisting drum, not shown, but disclosed in the aforesaid Hallenbeck application. As the cable supports the bucket by means of a pivoted bail, and as the bail must be kept out of contact with the extension chute, a sheave 45 is mounted at the top of the pit in the plane of the hoist cable, so as to engage therewith as shown in Fig. 1, thus obviating fouling of the bail on the gate assembly. The links 26 and 30 and the position of shaft 30a on frame 27 are made adjustable to compensate for construction errors, loading conditions and wear.

The employment of a bucket which as disclosed in the aforesaid pending application has a single roller on each side (as contrasted with the two roller bucket of the A. C. Bennett Patent No. 1,741,123, dated Feb. 10, 1931) leads to important economies and advantages, as will be explained, and is made possible because the bucket is not subjected to a reaction when opening or closing the gate; and this is true because the bucket rollers, which impart the thrust which operates the gate, rotate on the pivot axis of the bucket bail, so that there is no moment arm to turn the bucket and hence effect spillage of its contents in the pit. Among the advantages of an installation employing the described gate-operating mechanism and the improved bucket of my pending application are (1) a shortening of the bail by six inches, thus giving better stabilizing action (such action being fully explained in the W. H. Towne application, Serial No. 146,890 filed Nov. 8, 1926 and assigned to the assignee of this application);

(2) a reduction in the weight of the bucket, due to the smaller bail and elimination of one roller and its support on each side of the bucket, and also the elimination of a bucket-closing rig (compare the bucket of the aforesaid A. C. Bennett patent);

(3) a reduction in the weight of the bucket-guiding track of one ton or more, thus saving material and labor of erection;

(4) an increase of some six inches more storage room in each bin due to the shortening of the bail, which in a six bin plant with bins of 20 feet diameter means 22 tons additional storage capacity, without any increase in costs, but an actual saving instead;

(5) a saving of six inches in the depth of the pit, because of the elimination of the closing abutment described in the aforesaid A. C. Bennett patent, thus saving labor of digging, and expense in building the concrete work; and (6) elimination of spillage into the pit, as the bucket is closed when it descends into the pit (and hence particles of the material which are caught on the bucket are not shaken loose and dropped into the pit), and as the bucket is always under the chute whenever any material can fall or be thrown out of the mouth of the chute.

While the invention has been described in connection with trolley bucket installations, some of the features may be useful with skip hoists and other hoist buckets which must be loaded by gravity.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In combination, a bottom-discharging bucket having a bail pivoted to the opposite sides at the top, by which it is suspended; a pair of rollers rotatably mounted on opposite sides of the bucket; the axis of rotation of said rollers coinciding with the pivot axis of the bail; a hopper; inclined bucket guides adjacent the hopper along which the rollers move; a movable gate closing said hopper; and mechanism attached to said gate and extending into the path of movement of said rollers to be moved thereby to open and close the gate as the bucket descends and ascends.

2. In combination, a bucket having means projecting therefrom; a hopper; a movable gate for governing flow of materials from said hopper; and mechanism for moving said gate by means of said bucket, comprising a link pivoted to the gate and extending downwardly, a frame pivoted at a fixed point beneath the hopper and pivotally connected with the lower end of said link, another link pivotally connected to said frame at its lower end and extending upwardly, a guide, and means at the upper end of the second-named link and movable along said guide; said projecting means on the bucket encountering said movable guided means when the bucket descends near the gate.

3. In combination, a bucket having rollers projecting therefrom; a pair of guides for the bucket along which the rollers may move; a hopper; a movable gate for governing discharge from the hopper; and mechanism for moving said gate by means of said bucket comprising a link pivoted to the gate and extending downwardly, a frame pivoted at a fixed point beneath said hopper and pivotally connected with the lower end of said link, another link pivotally connected to said frame at its lower end and extending upwardly, and means at the upper end of the second-named link which is movable along one of said guides and which is engaged by the corresponding roller.

4. In combination, a bucket having rollers projecting therefrom; a pair of guides for the bucket along which the rollers may move; a hopper; a movable gate for governing discharge from the hopper; and mechanism for moving said gate by means of said bucket comprising a link pivoted to the gate and extending downwardly, a frame pivoted at a fixed point beneath said hopper and pivotally connected with the lower end of said link, another link pivotally connected to said frame at its lower end and extending upwardly, a slide-block at the upper end of the second-named link which is slidable along one of said guides, and means attached to the slide-block and engageable by the bucket roller in said guide to operatively connect the bucket and slide-block together.

5. In combination, a bucket having rollers projecting therefrom; a pair of guides for the bucket along which the rollers may move; a hopper; a movable gate for governing discharge from the hopper; and mechanism for moving said gate by means of said bucket comprising a link pivoted to the gate and extending downwardly, a frame pivoted at a fixed point beneath said hopper and pivotally connected with the lower end of said link, another link pivotally connected to said frame at its lower end and extending upwardly, a slide-block at the upper end of the second-named link which is slidable along one of said guides, means attached to the slide-block and engageable by the bucket roller in said guide to operatively connect the bucket and slide-block together; and means fixed to the bucket guide along which the slide-block moves to effect automatic disengagement of the bucket roller from the means which is attached to the slide-block, when the bucket ascends.

6. Means for governing the flow of materials from hoppers and the like comprising, in combination, a gate which is pivoted to swing upwardly to close the hopper; a link pivoted to the gate and extending downwardly; a frame pivoted beneath the gate and pivotally connected with said link; a second link pivotally connected to said frame and extending upwardly; a slide-block pivotally connected with the upper end of the second link; means to guide the slide-block during sliding; and a counterweight connected to the gate to tend to raise and close the same automatically when the bucket permits.

7. Means for governing the flow of materials from hoppers and the like comprising, in combination, a gate which is pivoted to swing upwardly to close the hopper; a link pivoted to the gate and extending downwardly; a frame pivoted beneath the gate and pivotally connected with said link; a second link pivotally connected to said frame and extending upwardly; a slide-block pivotally connected with the upper end of the second link; means to guide the slide-block during sliding; a lever pivoted at one end to the slide-block; and an abutment on the free end of the lever.

8. Means for governing the flow of materials from hoppers and the like comprising, in combination, a gate which is pivoted to swing upwardly to close the hopper; a link pivoted to the gate and extending downwardly; a frame pivoted beneath the gate and pivotally connected with said link; a second link pivotally connected to said frame and extending upwardly; a slide-block pivotally connected with the upper end of the second link; means to guide the slide-block during sliding; a lever pivoted at one end to the slide-block; a roller on the pivot axis of said lever; another roller on the free end of the lever; and a counterweight connected to the gate to tend to raise and close the same automatically when the bucket permits.

9. Means for governing the flow of materials from hoppers and the like comprising, in combination, a gate which is pivoted to swing upwardly to close the hopper; a link pivoted to the gate and extending downwardly; a frame pivoted beneath the gate and pivotally connected with said link; a second link pivotally connected to said frame and extending upwardly; a slide-block pivotally connected with the upper end of the second link; means to guide the slide-block during sliding; a lever pivoted at one end to the slide-block; an abutment on the free end of the lever; and fixed means in the path of said lever to turn the same on its pivot when the slide-block reaches a certain point on said guide.

10. Means for governing the flow of materials from hoppers and the like comprising, in combination, a gate which is pivoted to swing upwardly to close the hopper; a link pivoted to the gate and extending downwardly; a frame pivoted beneath the gate and pivotally connected with said link; a second link pivotally connected to said frame and extending upwardly; a slide-block pivotally connected with the upper end of the second link; means to guide the slide-block during sliding; a lever pivoted at one end to the slide-block; an abutment on the free end of the lever; means on the slide-block to limit swinging of said lever on its pivot in one direction to prevent it from assuming a dead-center position; and fixed means in the path of said lever to turn the same on its pivot when the slide-block reaches a certain point on said guide.

11. Means for governing the flow of materials from hoppers and the like comprising, in combination, a gate which is pivoted to swing upwardly to close the hopper; a link pivoted to the gate and extending downwardly; a frame pivoted beneath the gate and pivotally connected with said link; a second link pivotally connected to said frame and extending upwardly; a slide-block pivotally connected with the upper end of the second link; means to guide the slide-block during sliding; a lever pivoted at one end to the slide-block; an abutment on the free end of the lever; means on the slide-block to limit swinging of said lever on its pivot in one direction to prevent it from assuming a dead-center position; fixed means in the path of said lever to turn the same on its pivot when the slide-block reaches a certain point on said guide; rollers at the opposite ends of said lever, one roller being rotatable on the pivot axis of the lever, the other roller being engageable with the guide; and a counterweight connected to the gate to tend to raise and close the same automatically when the bucket permits.

12. Apparatus of the character described comprising, in combination, a gate which moves upwardly to close a passageway; gate-operating mechanism pivotally connected to and lying below the gate; a pair of fixed, parallel bucket guides, inclined to the vertical and extending below and above the gate; a pair of slide-blocks movable along said guides and connected to said mechanism; a pair of short levers each pivotally connected at its lower end to a slide-block and having an abutment at its upper end; the slide-blocks each having an abutment at the lower end of the lever, and the two abutments being adapted to receive between them any means projecting from the sides of the bucket, so as temporarily to engage the bucket with the gate-operating mechanism; and means to prevent said levers from assuming the dead-center position, thereby to insure engagement of the parts aforesaid when the bucket descends.

STANLEY H. DURBIN.